(12) United States Patent (10) Patent No.: US 8,611,445 B2
Rajendran et al. (45) Date of Patent: Dec. 17, 2013

(54) MULTIPLE-INPUT MULTIPLE-OUTPUT WIRELESS TRANSCEIVER ARCHITECTURE

(75) Inventors: Gireesh Rajendran, Trivandrum (IN); Anand Kannan, Bangalore (IN); Krishnaswamy Thiagarajan, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 361 days.

(21) Appl. No.: 12/892,976

(22) Filed: Sep. 29, 2010

(65) Prior Publication Data

US 2012/0076241 A1 Mar. 29, 2012

(51) Int. Cl.
*H04L 5/12* (2006.01)
(52) U.S. Cl.
USPC ........... 375/261; 375/147; 375/219; 375/324; 375/340; 455/132; 455/146; 455/160.1
(58) Field of Classification Search
USPC ......... 375/147, 219, 260, 261, 267, 268, 271, 375/279, 322–324, 340; 455/130, 132, 144, 455/146, 150.1, 160.1, 168.1, 179.1, 180.1, 455/188.1, 209, 246, 266
See application file for complete search history.

(56) References Cited

U.S. PATENT DOCUMENTS

| 8,160,522 | B2 * | 4/2012 | Lee et al. | 455/132 |
| 8,363,695 | B2 * | 1/2013 | Mochizuki | 375/136 |
| 2011/0019723 | A1 * | 1/2011 | Lerner et al. | 375/219 |
| 2011/0299618 | A1 * | 12/2011 | Hammerschmidt et al. | 375/267 |

OTHER PUBLICATIONS

"Boosting Wireless LAN Performance with Full Compatibility", http://at-eros.com/whitepapers/MIMO_WLAN_Perf_whitepaper. pdf, © 2005 Atheros Communications, Inc, Year Jun. 2005, pp. 1-9.

* cited by examiner

*Primary Examiner* — Dac Ha
(74) *Attorney, Agent, or Firm* — W. James Brady, III; Frederick J. Telecky, Jr.

(57) ABSTRACT

A wireless transceiver includes a receiver and a transmitter, the receiver and transmitter implemented to have multiple receive and transmit channels respectively, to provide multiple-input multiple-output (MIMO) capability. In an embodiment, the transceiver is implemented to include two transmit channels and two receive channels. Some blocks/circuitry of each of the receive and transmit channels are implemented with reduced area and current consumption, with a corresponding increase in noise. In a single-input single-output (SISO) mode of operation, the receiver combines the output of both the receive channels to compensate for the increase in noise due to the implementation with smaller area and lower current consumption. Similarly, the transmitter combines the output of both the transmit channels to compensate for the increase in noise. The transceiver operates with no signal degradation in SISO mode, and with a small degradation in signal quality in the MIMO mode.

6 Claims, 3 Drawing Sheets

MULTIPLE-INPUT MULTIPLE-OUTPUT WIRELESS TRANSCEIVER ARCHITECTURE

BACKGROUND

1. Technical Field

Embodiments of the present disclosure relate generally to wireless transceivers, and more specifically to multiple-input multiple-output (MIMO) wireless transceiver architecture.

2. Related Art

A wireless transceiver receives and transmits signals wirelessly (on a wireless medium), and contains corresponding receive and transmit circuits. Some examples of wireless devices are mobile phones, personal digital assistants (PDA), etc. A wireless transceiver may contain one or more antennas for transmitting and receiving the corresponding signal(s) on the wireless medium. Transceiver architecture generally refers to the arrangement of circuits/components in the receiver and their interconnections for performing the desired transmit and receive operations.

Multiple-input multiple-output (MIMO) approaches may be used in wireless transceivers. A MIMO approach uses multiple antennas at both the transmitter and the receiver side for respective transmit and receive operations. Since multiple antennas are used, multiple signals may be transmitted and/or received in parallel, thereby providing several benefits such as increased data throughput, mitigation of multipath effects, etc.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

A receiver includes a first low-noise amplifier (LNA) to receive a first wireless signal from a first antenna and to generate a first amplified signal, a second LNA to receive a second wireless signal from a second antenna and to generate a second amplified signal, a multiplexer to receive the first amplified signal and the second amplified signal and to provide one of the first amplified signal and the second amplified signal as an output, a first in-phase processing block to process the first amplified signal to generate a first set of digital values representing a first in-phase baseband signal, a first quadrature-phase processing block to process the first amplified signal to generate a second set of digital values representing a first quadrature-phase baseband signal, a second in-phase processing block to process the output of the multiplexer to generate a third set of digital values representing a second in-phase baseband signal, a second quadrature-phase processing block to process the output of the multiplexer to generate a fourth set of digital values representing a second quadrature-phase baseband signal, and a baseband processor to process the first set of digital values, the second set of digital values, the third set of digital values and the fourth set of digital values. In a multiple-input multiple-output (MIMO) mode of operation of the receiver, the multiplexer is configurable to provide the second amplified signal as the output, the baseband processor processing the first set of digital values and the second set of digital values to extract information contained in the first wireless signal and processing the third set of digital values and the fourth set of digital values to extract information contained in the second wireless signal. In a single-input single-output (SISO) mode of operation of the receiver, the multiplexer is configurable to provide the first amplified signal as the output, the baseband processor processing the first set of digital values, the second set of digital values, the third set of digital values and the fourth set of digital values to extract information contained in the first wireless signal.

A transmitter includes a transmit processor to generate a first set of digital values, a second set of digital values, a third set of digital values and a fourth set of digital values, a first in-phase transmit processing block to process the first set of digital values to generate a first in-phase up-converted signal, a first quadrature-phase transmit processing block to process the second set of digital values to generate a first quadrature-phase up-converted signal, a second in-phase transmit processing block to process the third set of digital values to generate a second in-phase up-converted signal, a second quadrature-phase transmit processing block to process the fourth set of digital values to generate a second quadrature-phase up-converted signal, a first power amplifier to receive a first input and to generate a first power-amplified output, and a second power amplifier to receive a second input and to generate a second power-amplified output. In a multiple-input multiple-output (MIMO) mode of operation of the transmitter, a sum of the first in-phase up-converted signal and the first quadrature-phase up-converted signal is provided as the first input to the first power amplifier, and a sum of the second in-phase up-converted signal and the second quadrature-phase up-converted signal is provided as the second input to the second power amplifier, the first power-amplified output being transmitted by a first antenna, and the second power-amplified output being transmitted by a second antenna. In a single-input single-output (SISO) mode of operation of the transmitter a sum of the first in-phase up-converted signal, the first quadrature-phase up-converted signal, the second in-phase up-converted signal, and the second quadrature-phase up-converted signal is provided as the first input to the first power amplifier, the first power-amplified output being transmitted by the first antenna.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

The drawing in which an element first appears is indicated by the leftmost digit(s) in the corresponding reference number.

DETAILED DESCRIPTION

Various embodiments are described below with several examples for illustration.

1. Example Environment

Figure 1:
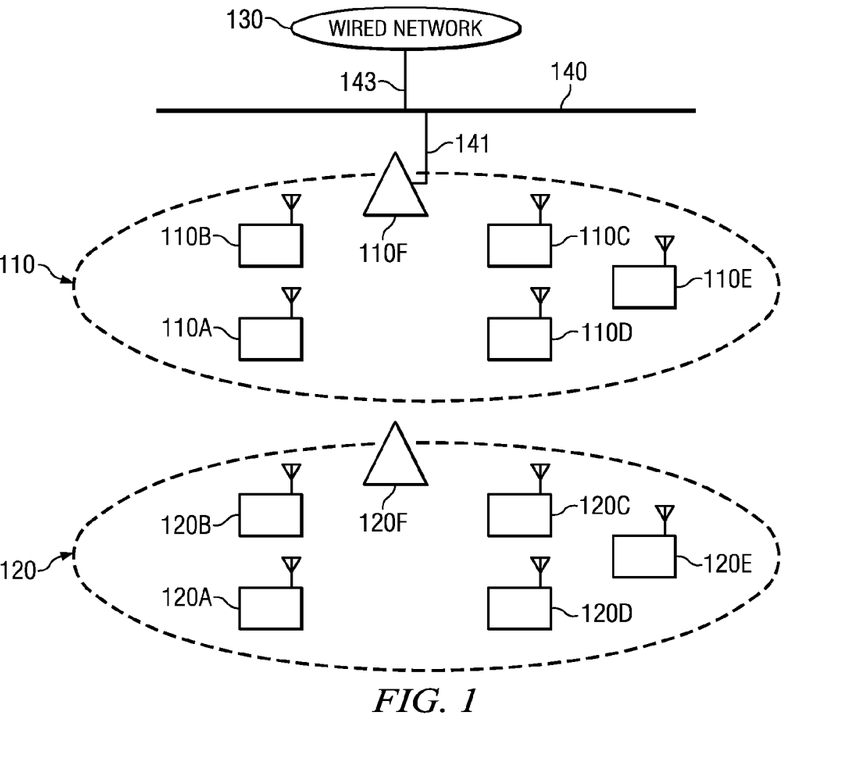
FIG. 1 is a block diagram of an example environment in which several embodiments can be implemented.

FIG. 1 is a block diagram illustrating an example environment in which several embodiments may be implemented. The example environment is shown containing only representative systems for illustration. However, real-world environments may contain many more systems/components as will be apparent to one skilled in the relevant arts.

The diagram is shown containing two Basic Service Sets (BSS) 110 and 120, wired network 130, and wired network backbone 140. In the example environment shown in FIG. 1, the respective components are assumed to be designed to operate consistent with the 802.11 WLAN standards (including revisions such as 802.11a, 802.11b, 802.11g, 802.11n, etc.). However, the features can be implemented in various other environments and according to other standards or protocols as well, including WiMAX (Worldwide Interoperability for Microwave Access), UMTS (Universal Mobile Telecommunications System), 3GPP Long Term Evolution (LTE), etc.

BSS 110 contains wireless transceivers 110A through 110E, and access point (AP) 110F. Each of wireless transceivers 110A through 110E may be any electronic/computing device (mobile or fixed) equipped with a wireless network interface that enables wireless communication. For example, wireless transceivers 110A through 110E may represent devices such as laptop computers, personal digital assistants (PDA), mobile phones, etc.

AP 110F is connected by a wired medium (141) to wired network backbone 140, which in turn is connected to wired network 130 via path 143. AP 110F provides wireless transceivers 110A through 110E connectivity with each other. Thus, for example, if wireless transceiver 110A is to communicate (transfer data to) with wireless transceiver 110C, it may do so by first communicating with AP 110F, which in turn communicates with wireless transceiver 110C. Thus, a wireless transceiver (any of 110A-110E) wanting to communicate with another wireless transceiver in BSS 110 may do so via AP 110F. AP 110F also provides wireless transceivers 110A-110E connectivity to wired network 130 and transceivers in BSS 120. Each of wireless transceivers 110A through 110E in BSS 110 may also communicate with each other directly, without requiring the mediation of AP 110F.

BSS 120 and constituent components wireless transceivers 120A through 120E and AP 120F operate in a manner similar to that described above with respect to BSS 110, and the related description is not repeated here in the interest of conciseness.

All transceivers in BSS 110 and BSS 120 may communicate with each other on a shared frequency band such as, for example, the 2.4 GHz (or 5.1 GHz) band specified by WLAN standards. The transceivers may operate in the same channel or different channels (adjacent or overlapping) within a shared band.

The transceivers of FIG. 1 may be designed to operate in one or more of several modes of operation such as single-input single-output (SISO) mode, MIMO mode, etc. Although the transceivers of FIG. 1 are shown containing only one antenna each, each of the transceivers may contain multiple antennas to support MIMO operation.

In SISO mode, a pair of transmitting and receiving transceivers communicates in any interval using only one pair of antennas (one each at the transmitting and the receiving ends), and thus only one wireless signal may be transmitted (and received) in any time interval. In MIMO mode as noted above, multiple antennas are employed at both the transmitter and the receiver side, and multiple signals may be transmitted and received in parallel. The implementation of a wireless transceiver in an embodiment is described in sections below. Implementation of the receiver portion of the transceiver is described first.

2. Receiver

Figures 2, 3:
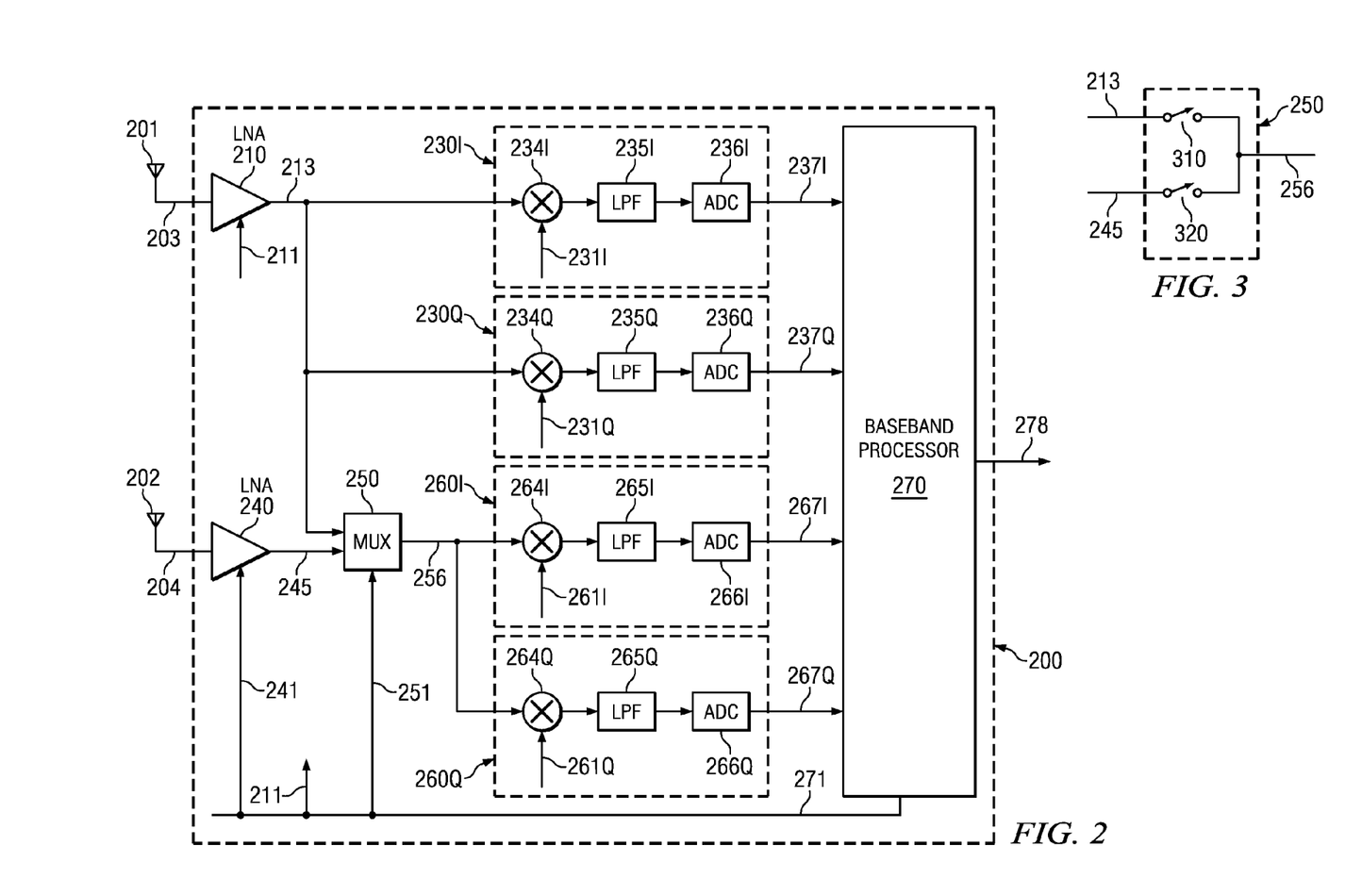
FIG. 2 is a diagram illustrating the details of receiver portion of a transceiver, in an embodiment.
FIG. 3 is a diagram illustrating the implementation of a multiplexer used in a receiver portion of a transceiver, in an embodiment.

FIG. 2 is a diagram illustrating the details of a receiver portion of a transceiver (e.g., transceiver 110A of FIG. 1), in an embodiment. Receiver 200 of transceiver 110A is shown containing low-noise amplifiers (LNA) 210 and 240, multiplexer (MUX) 250, mixers 234I, 234Q, 264I and 264Q, low-pass filters (LPF) 235I, 235Q, 265I and 265Q, analog-to-digital converters (ADC) 236I, 236Q, 266I and 266Q, and baseband processor 270. FIG. 2 also shows antennas 201 and 202. In FIG. 2, receiver 200 is shown as containing components/blocks for receiving and processing only two signals in parallel. However, the techniques described herein can be extended in general to more than two inputs also.

Antenna 201 receives a wireless signal (first wireless signal) and provides the signal to LNA 210 via path 203. Antenna 202 receives another wireless signal (second wireless signal) and provides the signal to LNA 240 via path 204. Each of the wireless signals represents a modulated signal that carries information. In an embodiment, the wireless signals are generated according to Orthogonal Frequency Division Multiplexing (OFDM) in the frequency band specified by WLAN standards. Antennas 201 and 202 may be implemented to achieve space diversity multiplexing to permit multiple-input multiple-output (MIMO) operation in one of several known ways. For example, the gain pattern of antenna 201 may be designed to have a maximum value only in the direction of the signal to be received by antenna 201. Similarly, the gain pattern of antenna 202 may be designed to have a maximum value only in the direction of the signal to be received by antenna 202. The respective signals received by each of antennas 201 and 202 may be transmitted using beamforming techniques. Various other techniques such as space-time coding may also be used instead to improve signal quality of signals received at antennas 201 and 202. Antennas 201 and 202 may be shared with a transmitter portion (shown in FIG. 4) of transceiver 110. Although shown as being separate from receiver 200, receiver 200 may be viewed as including antennas 201 and 202 as well.

LNA 210 (first low-noise amplifier) amplifies the wireless signal received from antenna 201 and generates an amplified signal (first amplified signal) on path 213. LNA 240 (second low-noise amplifier) amplifies the wireless signal received from antenna 202 and generates an amplified signal (second amplified signal) on path 245. LNAs 210 and 240 provide front-end amplification with minimal noise addition to the respective signals received from the antennas. Signal 213 is provided to each of processing blocks 230I and 230Q, and also as an input to MUX 250. LNAs 210 and 240 receive gain value settings as inputs on paths 211 and 241 respectively from baseband processor 270.

MUX 250 provides one of signals 213 and 245 on path 256 based on the value of a select input received via path 251 from baseband processor 270. Output 256 of MUX 250 is provided to each of processing blocks 260I and 260Q. MUX 250 receives a select signal on path 251. Paths 211, 241 and 251 are assumed to be contained in path 271.

Mixer 234I, LPF 235I, and ADC 236I may be viewed as signal processing block 230I (first in-phase receive processing block). Mixer 234Q, LPF 235Q, and ADC 236Q may be viewed as signal processing block 230Q (first quadrature-phase receive processing block). Mixer 264I, LPF 265I, and ADC 266I may be viewed as signal processing block 260I (second in-phase receive processing block). Mixer 264Q, LPF 265Q, and ADC 266Q may be viewed as signal processing block 260Q (second quadrature-phase receive processing block). In the embodiment, I-Q demodulation is employed in receiver 200, and blocks 230I and 230Q represent I (in-phase) and Q (quadrature) processing blocks respectively. Similarly, blocks 260I and 260Q represent I (in-phase) and Q (quadrature) processing blocks respectively. Blocks 230I and 230Q together represent one receive channel. Blocks 260I and 260Q together represent a second receive channel.

Mixer 234I receives a local oscillator (LO) signal on path 231I, mixes (i.e., multiplies) signal 213 with LO signal 231I, and provides the outputs of the mixing operation to LPF 235I. LPF 235I performs low-pass filtering on the output of mixer 234I to reject undesired side-bands generated by the mixing operation in mixer 234I, and provides the desired (lower) side-band to ADC 236I. ADC 236I converts the (analog) output of LPF 235I to corresponding digital values (first set of digital values), and forwards the digital values on path 237I. Mixer 234Q receives a local oscillator (LO) signal on path 231Q, mixes (multiplies) signal 213 with LO signal 231Q, and provides the outputs of the mixing operation to LPF 235Q. LPF 235Q performs low-pass filtering on the output of mixer 234Q to reject undesired side-bands generated by the mixing operation in mixer 234Q, and provides the desired (lower) side-band to ADC 236Q. ADC 236Q converts the (analog) output of LPF 235Q to corresponding digital values (second set of digital values), and forwards the digital values on path 237Q. In an embodiment, LO signals 231I and 231Q are sinusoidal signals, each with a frequency equal to the carrier frequency of the signal received by antenna 201. In the embodiment, therefore, receiver 200 employs direct down-conversion (zero IF) techniques and I-Q demodulation in each of MIMO and SISO modes of operation. However, in other embodiments, receiver 200 may be implemented as a non-zero IF receiver, with down conversion to zero IF done by baseband processor 270. Implementation of circuit blocks (in such non-zero IF implementations) corresponding blocks 230I, 230Q, 260I and 260Q may be performed in a manner similar to that described herein with respect to blocks 230I, 230Q, 260I and 260Q. LO signals 231I and 231Q are in phase quadrature with respect to each other, i.e., the phase difference between signals 231I and 231Q equals 90 degrees. The digital values provided on path 237I represent the baseband signal (first in-phase baseband signal) obtained by direct down-conversion performed in block 230I. The digital values provided on path 237Q represent the baseband signal (first quadrature-phase baseband signal) obtained by direct down-conversion performed in block 230Q.

Mixer 264I receives a local oscillator (LO) signal on path 261I, mixes (multiplies) signal 256 with LO signal 261I, and provides the outputs of the mixing operation to LPF 265I. LPF 265I performs low-pass filtering on the output of mixer 264I to reject undesired side-bands generated by the mixing operation in mixer 264I, and provides the desired (lower) side-band to ADC 266I. ADC 266I converts the (analog) output of LPF 265I to corresponding digital values (third set of digital values), and forwards the digital values on path 267I. Mixer 264Q receives a local oscillator (LO) signal on path 261Q, mixes (multiplies) signal 256 with LO signal 261Q, and provides the outputs of the mixing operation to LPF 265Q. LPF 265Q performs low-pass filtering on the output of mixer 264Q to reject undesired side-bands generated by the mixing operation in mixer 264Q, and provides the desired (lower) side-band to ADC 266Q. ADC 266Q converts the (analog) output of LPF 265Q to corresponding digital values (fourth set of digital values), and forwards the digital values on path 267Q. LO signals 261I and 261Q are sinusoidal signals, each with a frequency equal to the carrier frequency of the signal received by antenna 201 consistent with the direct down-conversion (zero IF) techniques used in receiver 200 in an embodiment. LO signals 261I and 261Q are in phase quadrature with respect to each other. The digital values provided on path 267I represent the baseband signal (second in-phase baseband signal) obtained by direct down-conversion performed in block 260I. The digital values provided on path 267Q represent the baseband signal (second quadrature-phase baseband signal) obtained by direct down-conversion performed in block 260Q.

LNAs 210 and 240 may receive control inputs for setting corresponding gain values via path 271 from baseband processor 270. LO signals 231I, 231Q, 261I and 261Q are generated by respective signal generators, not shown in FIG. 2, but assumed to be contained in receiver 200 (or within transceiver 110A which contains receiver 200). Although not shown, blocks 230I, 230Q, 260I and 260Q may each contain a variable gain amplifier (VGA) connected between the respective LPF and ADC in the block. Thus, for example, the output of LPF 235I may be amplified by a VGA, with the VGA providing the amplified signal to ADC 236I. The gain provided by such VGAs may be programmable by baseband processor 270.

Baseband processor 270 processes the digital values received via paths 237I, 237Q, 267I and 267Q to extract the information (e.g., data) carried by signals 213 and 256. Depending on the specific modulation technique (as may be specified by a corresponding standard such as, for example, WLAN, WiMAX, UMTS, etc.) used in the received modulated signal(s) (received via antennas 201 and 202), baseband processor 270 may perform corresponding operations required to demodulate the signals. Assuming, for example, that the signals received via antennas 201 and 202 are OFDM signals (e.g., according to WLAN standards), baseband processor 280 may perform operations such as Fast Fourier Transform (FFT), offset correction, de-interleaving, etc., consistent with demodulation of an OFDM signal. Baseband processor 270 may provide the demodulated data on path 278 to other components, for example, an application processor (not shown) which may use the data to provide corresponding user applications.

In MIMO mode, multiple wireless signals (modulated signals) are received and processed by receiver 200 in parallel (simultaneously), each of the multiple signals being processed in a corresponding receive channel. In the MIMO mode of operation of receiver 200, baseband processor 270 sets select input 251 of MUX 250 to cause MUX 250 to forward signal 245 on path 256. Blocks 230I and 230Q process the wireless signal received by antenna 201. Blocks 260I and 260Q process the wireless signal received by antenna 202. Baseband processor 270 performs I-Q demodulation on the digital values on paths 237I and 237Q to recover the information or data carried by the modulated signal received by antenna 201, and I-Q demodulation on the digital values on paths 267I and 267Q to recover the information or data carried by the modulated signal received by antenna 202.

In SISO mode of operation, a single wireless signal is processed by receiver 200. In the SISO mode of operation of receiver 200, baseband processor 270 sets select input 251 of MUX 250 to a value to cause MUX 250 to forward signal 213 on path 256. Blocks 230I and 230Q, as well as blocks 260I and 260Q, process the wireless signal received by antenna 201. Baseband processor 270 adds the digital values on path 237I and 267I (each representing in-phase (I) component obtained from the wireless signal received by antenna 201. Denoting the digital values generated on path 237I as I1, and the digital values on path 267I as I2, baseband processor 270 computes the sum (I1+I2). The computation of the sum by baseband processor 270 may be performed after decimation in decimation filters (digital filters implemented within baseband processor 270), if the sampling rates of ADCs 236I and 266I are much higher (e.g., 10 times or more as when ADCs 236I and 266I are each implemented as single-bit sigma-delta converters) than the signal band-width (bandwidth of signal of interest contained in modulated signal received by antenna 201). If ADCs 236I and 266I are implemented as multi-bit ADCs with sampling rates of the order of two to four times the signal bandwidth, computation of the sum (I1+I2) may be performed sample-wise at each sampling instance of ADCs 236I and 266I, each of which may be clocked by a same sampling clock (not shown). Thus, assuming S1 and S2 are the respective digital samples generated on paths 237I and 267I respectively at a sampling instance t0, baseband processor 270 adds S1 and S2. Assuming S3 and S4 are the respective digital samples generated on paths 237I and 267I respectively at a next sampling instance t1, baseband processor 270 adds S3 and S4, and so on. Similarly, baseband processor 270 adds the digital values on path 237Q and 267Q, each representing a quadrature-phase (Q) component obtained from the wireless signal received by antenna 201. Representing the digital values generated on path 237Q as Q1, and the digital values on path 267Q as Q2, baseband processor 270 computes the sum (Q1+Q2). The addition may be performed sample-wise, as described above. The sum (I1+I2) may be viewed as a final in-phase baseband signal, and the sum (Q1+Q2) may be viewed as a final quadrature-phase baseband signal.

Each of blocks 230I and 230Q (and therefore the receive channel represented by the combination of blocks 230I and 230Q) is implemented with an area equal to half the area and current consumption equal to half the current consumption requirement that would typically be required for their implementation if receiver 200 is to be operated only in SISO mode, with blocks 230I and 230Q operating as the in-phase and quadrature-phase processing blocks in the SISO mode. Similarly, each of blocks 260I and 260Q (and therefore the receive channel represented by the combination of blocks 260I and 260Q) is implemented with an area equal to half the area and current consumption equal to half the current consumption requirement that would typically be required for their implementation if receiver 200 is to be operated only in SISO mode, with blocks 260I and 260Q operating as the in-phase and quadrature-phase processing blocks in the SISO mode.

A prior approach to implement MIMO functionality in a transceiver replicates I and Q blocks (i.e., one receive channel) of a SISO-only receiver for each additional receive channel. However, such an approach doubles (for a two-channel implementation) the area requirement and current consumption.

In contrast, the approach of FIG. 2 employs I and Q blocks with half the area (and with half the current consumption) otherwise (or typically) required. In effect, the receive channel of a SISO-only receiver is split into two equal-area channels, each with half the area that would be required in the SISO-only implementation. Thus, the total area for the implementation of blocks 230I, 230Q, 260I and 260Q is minimized to equal the total area required for an in-phase processing block and quadrature-phase processing block alone (as would be contained in a SISO-only receiver, i.e. a single-channel receiver). The reduction in area may be obtained by reducing the area/dimensions of components such as transistors used to implement each of the blocks. The current consumption of each of blocks 230I, 230Q, 260I and 260Q is also reduced to approximately half the current otherwise required for their implementation if receiver 200 is to be operated only in SISO mode. Thus, two receive channels (230I/230Q and 260I/260Q in FIG. 2) are obtained in the same area (and approximately with the same current consumption) required for a single receive channel of a SISO-only receiver.

The reduction (halving) of area and current may result in a relative increase in noise in each of blocks 230I, 230Q, 260I and 260Q to the extent of 3 dB (decibels), thereby degrading the signal-to-noise ratio (SNR) of the signal (represented by the corresponding set of digital values) on each of paths 237I, 237Q, 267I and 267Q. However, such halving does not alter the frequency response of blocks 230I, 230Q, 260I & 260Q, thereby ensuring sufficient gain for the desired signal of interest and rejection of unwanted blocking signals outside the desired frequency band (frequency band occupied by the signal of interest).

In the MIMO mode, the approach of FIG. 2 may result in higher noise strength, and therefore reduced SNR (signal-to-noise ratio), on I and Q signals on respective paths 237I and 237Q. The increase in noise contribution of each of blocks 237I and 237Q may be of the order of 3 dB. However, the overall noise at the respective outputs 237I and 237Q of blocks 230I and 230Q will be dominated by the noise contributed by LNA 210 due to the amplification provided by LNA 210. As a result, the degradation in SNR at 237I & 237Q is limited to approximately 1 dB, the extent of degradation in SNR being dependant on the gain of LNA 210, as also described mathematically below. Similarly, baseband signals on respective I and Q paths 267I and 267Q may also be associated with approximately 1 dB higher noise and therefore reduced SNR. Consequently, demodulation of each of the two MIMO signals (received by antenna 201 and 202) may be associated with corresponding degradation, such as increased bit error rate. However, the reduction in sensitivity of receiver 200 in MIMO mode when referred back to antenna 201 (or 202) is less than 1 dB due to gain provided by LNA 210 (or LNA 240), as described next.

Assuming the signal power received at antenna 201 is Sinp, the gain provided by LNA 210 is Afe, and the noise added by LNA 210 is Nfe, the signal-to-noise ratio (SNR123) at the output of LNA 201 (i.e., path 213) may be expressed by the following equation:

$$SNR213 = (Sinp*Afe)/(Nfe*Afe) \qquad \text{Equation 1}$$

Assuming further that the gain provided by block 230I (or 230Q) is Aif, and the noise added by block 230I (or 230Q) is Nif, the signal-to-noise ratio (SNRbb) of the signal on path 237I (or 237Q) may be specified by the following equation:

$$SNRbb = (Sinp*Afe*Aif)/sqrt[(Nfe*Afe*Aif)^2 + (Nif*Aif)^2] \qquad \text{Equation 2}$$

wherein, sqrt is the square-root operator.

Equation 2 may be rewritten as specified below:

$$SNRbb = Sinp/sqrt[(Nfe)^2 + (Nif/Afe)^2] \qquad \text{Equation 3}$$

Noise contribution (Nif) of block 230I is divided by gain (Afe) of LNA 201. Hence, SNRbb may not be substantially degraded.

A similar analysis as provided above with respect to equations 1, 2 and 3 also applies for the SNR on paths 267I and 267Q. Thus, in MIMO mode receiver 200 demodulates signals received by each of antennas 201 and 202 without substantial degradation or error, while incurring no area or current overheads due to the reduction in implementation area.

In SISO mode, the wireless signal received by antenna 201 is processed by both the receive channels, namely blocks (230I and 230Q) as well as blocks (260I and 260Q). Baseband processor 270 adds the corresponding outputs of the two receive channels. Thus, baseband processor 270 adds digital values on path 237I to corresponding digital values on path 267I, with the sum representing a 'final' in-phase baseband signal. Similarly, baseband processor 270 adds digital values on path 237Q to corresponding digital values on path 267Q, with the sum representing a 'final' quadrature-phase baseband signal. The effect of such addition is that the signal strength (and noise contribution from LNA 210) as represented by the final in-phase and quadrature phase baseband signals doubles, while noise contribution from blocks 230I and 260I is increased by only 3 dB.

To illustrate by comparison, assume that the gain provided by LNA 210 is represented by Afe, and the noise added by LNA 210 is represented by Nfe. A conventional SISO receiver implementation (i.e., a receiver in which only blocks corresponding to 230I and 230Q are implemented, with each having an area and power consumption twice that of the respective blocks 230I and 230Q) will have a noise (mixer plus IF noise) of Nif, and gain of Aif, and provide an SNR as specified by the following equation:

$$\text{SNR-SISO-conventional} = Sig*Afe*Aif/sqrt[(Afe^2*Aif^2*Nfe^2)+(Aif^2*Nif^2)] \quad \text{Equation 4}$$

wherein,

Sig represents the SNR of the signal of interest, i.e., signal SNR of signal received at antenna 201, and 'sqrt' represents a "square-root of" operation.

Equation 4 may be simplified to the following equation:

$$\text{SNR-SISO-conventional} = Sig/sqrt((Nfe)^2+(Nif/Afe)^2) \quad \text{Equation 5}$$

However, when the receiver implementation is as described with respect to FIG. 2, the (mixer plus IF noise) contribution Nif-new of each of blocks 230I and 230Q is higher by 3 dB, and may be expressed by the following equation:

$$Nif\text{-new} = Nif*sqrt(2) \quad \text{Equation 6}$$

SNR at nodes 237I or 267I may be expressed by the following equation:

$$\text{SNR-half} = Sig/sqrt(Nfe^2+(Nif\text{-new}/Afe)^2) \quad \text{Equation 7}$$

wherein SNR-half represents the SNR at 237I or 267I.

Equation 7 may be simplified to the following equation:

$$\text{SNR-half} = Sig/sqrt[(Nfe^2+2*(Nif/Afe)^2)] \quad \text{Equation 8}$$

SNR of the sum of signals at nodes 237I and 267I (in SISO mode) may b expressed by the following equation:

$$\text{SNR-sum} = 2*Sig/sqrt((2Nfe)^2+2*2*(Nif/Afe)^2) \quad \text{Equation 9}$$

Simplifying Equation 9 provides the following expression:

$$\text{SNR-sum} = Sig/sqrt((Nfe)^2+(Nif/Afe)^2) \quad \text{Equation 10}$$

It may be observed that SNR-sum (Equation 10) in SISO mode equals SNR-SISO-conventional (Equation 5).

Receiver 200, thus implemented, supports MIMO with minimal SNR degradation (i.e., minimal degradation in signal quality), and SISO with no SNR degradation with respect to a 'conventional' SISO receiver implementation as noted above.

FIG. 3 is a diagram illustrating the implementation of MUX 250 in an embodiment. In FIG. 3, MUX 250 is shown implemented using switches (e.g., RF switches) 310 and 320. In MIMO mode of operation of receiver 200, switch 320 is closed and switch 310 is open. In SISO mode of operation of receiver 200, switch 320 is open and switch 310 is closed. The controls for opening and closing of switches 310 and 320 are assumed to be provided by baseband processor 270 via path 251.

Approaches similar to that used in receiver 200 for enabling MIMO operation using minimal additional circuitry (LNA 240 and MUX 250), and thus minimal area and power/current overhead, can be used in the transmitter portion of transceiver 110A as well, as described next.

3. Transmitter

Figure 4:
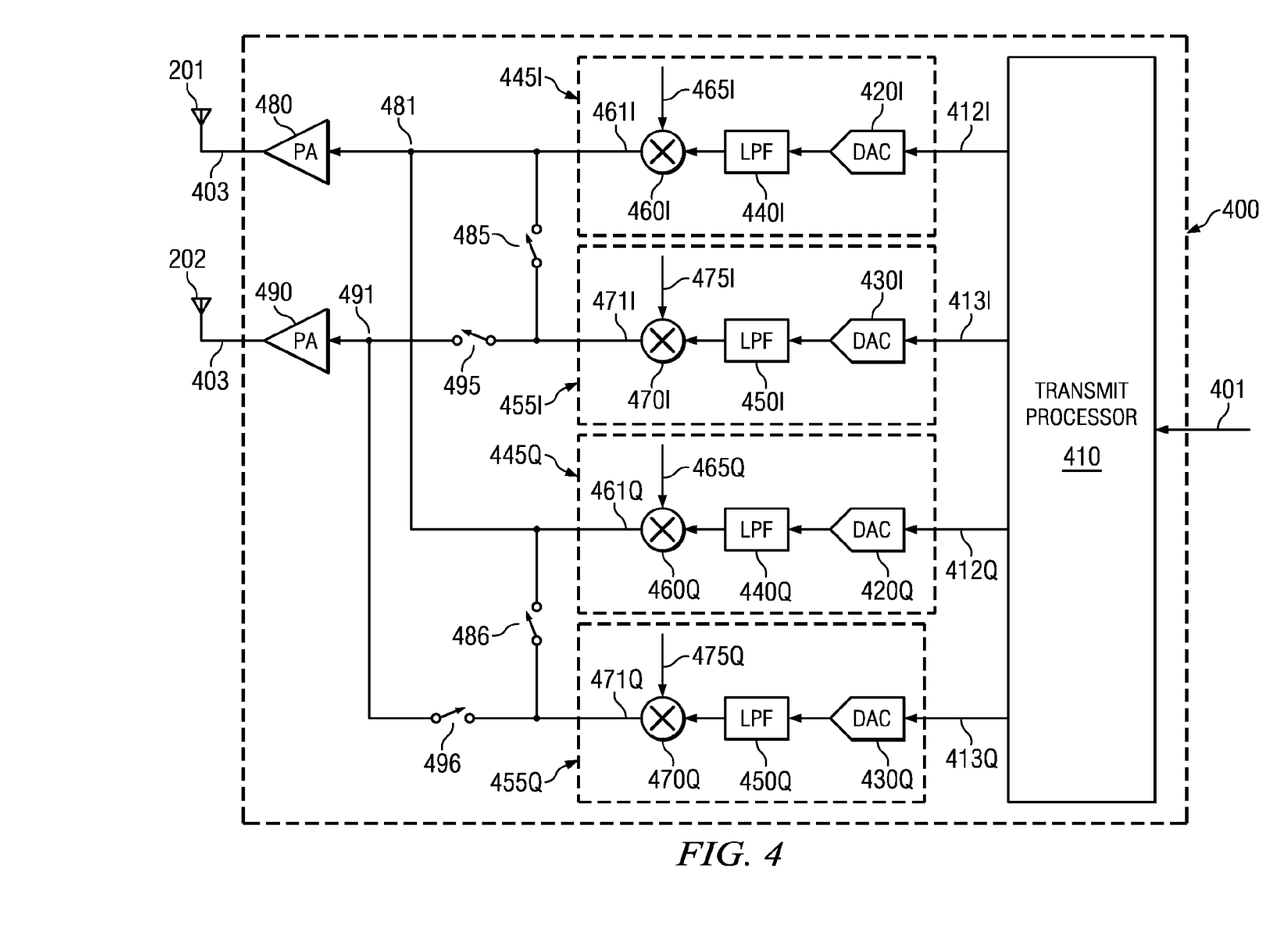
FIG. 4 is a block diagram illustrating the details of a transmitter portion of a transceiver, in an embodiment.

FIG. 4 is a block diagram illustrating the details of a transmitter portion of a transceiver (e.g., transceiver 110A) in an embodiment. Transmitter 400 is shown containing transmit processor 410, digital-to-analog converters (DAC) 420I, 420Q, 430I and 430Q, low-pass filters (LPF) 440I, 440Q, 450I and 450Q, mixers 460I, 460Q, 470I and 470Q, power amplifiers (PA) 480 and 490, and switches 485, 486, 495 and 496. Antennas 201 and 202 are also shown in FIG. 4.

The combination of DAC 420I, LPF 440I and mixer 460I may be viewed as in-phase transmit processing block 445I (first in-phase transmit processing block). The combination of DAC 430I, LPF 450I and mixer 470I may be viewed as in-phase transmit processing block 455I (second in-phase transmit processing block). The combination of DAC 420Q, LPF 440Q and mixer 460Q may be viewed as quadrature-phase transmit processing block 445Q (first quadrature-phase transmit processing block). The combination of DAC 430Q, LPF 450Q and mixer 470Q may be viewed as quadrature-phase transmit processing block 455Q (second quadrature-phase transmit processing block). In an embodiment, I-Q modulation is employed in transmitter 400. Blocks 445I and 445Q together represent one transmit channel, and respectively are the in-phase (I) and quadrature-phase (Q) processing blocks of the channel. Blocks 455I and 455Q together represent another transmit channel, and respectively are the in-phase (I) and quadrature-phase (Q) processing blocks of the channel.

Each of blocks 445I and 445Q (and therefore the transmit channel represented by blocks 445I and 445Q) is implemented with an area equal to half the area that would typically be required for their implementation if transmitter 400 is to be operated only in SISO mode, with blocks 445I and 445Q operating as the in-phase and quadrature-phase transmit processing blocks in the SISO mode. Similarly, each of blocks 455I and 455Q (and therefore the transmit channel represented by blocks 455I and 455Q) is implemented with an area equal to half the area that would typically be required for their implementation if transmitter 400 is to be operated only in SISO mode, with blocks 455I and 455Q operating as the in-phase and quadrature-phase transmit processing blocks in the SISO mode. Due to implementation with reduced area as noted above, the current consumption of each of the blocks 445I, 445Q, 455I and 455Q is reduced to half (approximately), and the noise contribution of each of the blocks is greater by 3 dB than otherwise.

Antennas 201 and 202 are used to transmit corresponding modulated signals received from power amplifiers 480 and 490 respectively. Although shown as being separate from transmitter 400, transmitter 400 may be viewed as including antennas 201 and 202 as well. Antennas 201 and 202 may be shared between receiver 200 (FIG. 2) and transmitter 400, as described below with respect to FIG. 6.

Transmit processor 410 receives data to be transmitted on path 401, for example, from an application processor (not shown), and may perform several operations such as Inverse-FFT (IFFT), data interleaving, etc., consistent with the desired modulation technique (assumed to be OFDM according to WLAN standards in this description) on the data to be transmitted. When operating consistent with other standards such as WiMAX, UMTS, etc., noted above, the operations may be correspondingly different. Although shown as a separate component, transmit processor may be contained within baseband processor 270 of FIG. 2.

The data received on paths 412I, 412Q, 413I and 413Q may be referred to respectively as a first set of I-data values, a second set of Q-data values, a third set of I-data values, and a fourth set of Q-data values.

When operating in SISO mode, transmit processor 410 generates I and Q data corresponding to the data received on path 401, and generates corresponding I-data on path 412I and Q-data on path 412Q. Transmit processor replicates the I and Q data provided on paths 412I and 412Q, and provides the replicated (identical) data on paths 413I and 413Q respectively as well. In SISO mode, switches 495 and 496 are open, and switches 485 and 486 are closed. As a result, the outputs of in-phase transmit processing blocks 445I and 455I are summed (added) to generate a 'final' in-phase signal, and the outputs of quadrature-phase transmit processing blocks 445Q and 455Q are summed to generate a 'final' quadrature-phase signal. The final in-phase signal and the final quadrature-phase signals are added, and the resulting sum is provided to PA 480. The addition (summing) operations noted above may be implemented in a known way, and node 481 may be viewed as a summing junction. PA 480 provides power amplification to the sum, and generates a power amplified signal, which is transmitted by antenna 201.

When operating in MIMO mode, transmit processor 410 receives two separate data streams (to be transmitted as two separate transmit signals by antennas 201 and 202 respectively) on path 401. Transmit processor 410 provides I-data and Q-data corresponding to one of the data streams on respective paths 412I and 412Q. Transmit processor 410 provides I-data and Q-data corresponding to the second data stream on respective paths 413I and 413Q. The two data streams may contain identical data values or different data values. In MIMO mode switches 485 and 486 are open, while switches 495 and 496 are closed. As a result, the outputs of in-phase transmit processing block 445I and quadrature-phase transmit processing block 445Q are added, and the sum is provided to PA 480. PA 480 provides power amplification to the corresponding sum received as input, and generates a power amplified signal, which is transmitted by antenna 201. The outputs of in-phase transmit processing block 455I and quadrature-phase transmit processing block 455Q are added, and the sum is provided to PA 490. PA 490 provides power amplification to the corresponding sum received as input, and generates a power amplified signal, which is transmitted by antenna 202. In an embodiment, transmitter 400 employs direct up-conversion in each of MIMO and SISO modes of operation.

Each of DACs 420I, 430I, 420Q and 430Q converts the respective set of digital values received as inputs on respective paths 412I, 413I, 412Q and 413Q from transmit processor 410 to corresponding analog levels (voltage or current). Each of low-pass filters 440I, 450I, 440Q and 450Q performs low-pass filtering of the respective analog signals received from DACs 420I, 430I, 420Q and 430Q, to provide a corresponding filtered analog signal to respective mixers 460I, 470I, 460Q and 470Q. The filtered analog signals represent analog values of the corresponding I-component or Q-component of the data to be transmitted using I-Q modulation.

Mixer 460I receives a local oscillator (LO or carrier) signal on path 465I and multiplies the carrier signal by the analog signal received from LPF 440I to vary the amplitude and/or phase of LO signal 465I consistent with the modulation technique used. Similarly, mixers 470I, 460Q and 470Q receive respective carrier signals on paths 475I, 465Q and 475Q, and modulate the respective carrier by the corresponding analog signal received from LPF 450I, 440Q and 450Q respectively to generate modulated signals (up-converted signals) as outputs on respective paths 461I, 471I, 461Q and 471Q. The up-converted signals on paths 461I, 461Q, 471Q and 471Q may be respectively referred to as a first in-phase up-converted signal, a first quadrature-phase up-converted signal, a second in-phase up-converted signal, and a second quadrature-phase up-converted signal.

The frequencies of carrier signals 465I, 475I, 465Q and 475Q may all be equal, and also equal to the carrier frequency of the modulated signal transmitted by each of antennas 201 and 202. Carrier signals 465I and 465Q are in phase quadrature with respect to each other. Carrier signals 475I and 475Q are in phase quadrature with respect to each other.

Transmitter 400 implemented as described above enables MIMO capability with minimal area overhead (additional amplifier PA 490), and minimal current consumption.

Figure 5:
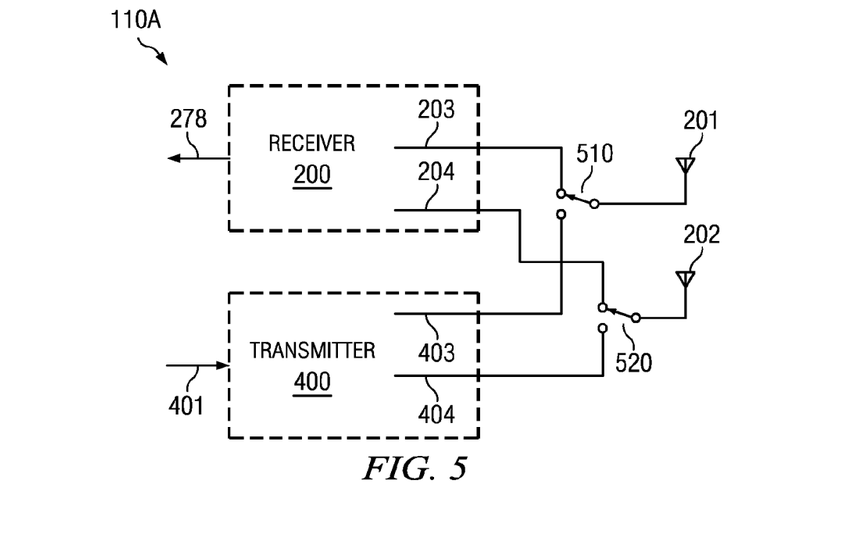
FIG. 5 is a diagram used to illustrate the manner in which antennas are shared between a receiver and a transmitter of a transceiver in an embodiment.

When antennas 201 and 202 are shared between receiver 200 and transmitter 400, transceiver 110A operates in any time interval either to receive wireless signals (receive mode) or to transmit wireless signals (transmit mode). FIG. 5 illustrates the manner in which antennas 201 and 202 are shared between receiver 200 and transmitter 400, in an embodiment. In receive mode, switches 510 and 520 are connected to paths 203 and 204 respectively, while in transmit mode switches 510 and 520 are connected to paths 403 and 404 respectively.

In the illustrations of FIGS. 2, 4 and 5, although terminals/nodes are shown with direct connections to various other terminals, it should be appreciated that additional components (as suited for the specific environment) may also be present in the path, and accordingly the connections may be viewed as being electrically coupled to the same connected terminals.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A receiver comprising:
a first low-noise amplifier (LNA) to receive a first wireless signal from a first antenna, and to generate a first amplified signal;
a second LNA to receive a second wireless signal from a second antenna, and to generate a second amplified signal;
a multiplexer to receive the first amplified signal and the second amplified signal and to provide one of the first amplified signal and the second amplified signal as an output;
a first in-phase receive processing block to process the first amplified signal to generate a first set of digital values representing a first in-phase baseband signal;
a first quadrature-phase receive processing block to process the first amplified signal to generate a second set of digital values representing a first quadrature-phase baseband signal;
a second in-phase processing receive block to process the output of the multiplexer to generate a third set of digital values representing a second in-phase baseband signal;

a second quadrature-phase receive processing block to process the output of the multiplexer to generate a fourth set of digital values representing a second quadrature-phase baseband signal; and a baseband processor to process the first set of digital values, the second set of digital values, the third set of digital values and the fourth set of digital values, wherein, in a multiple-input multiple-output (MIMO) mode of operation of the wireless receiver, the multiplexer is configurable to provide the second amplified signal as the output, the baseband processor processing the first set of digital values and the second set of digital values to extract information contained in the first wireless signal and processing the third set of digital values and the fourth set of digital values to extract information contained in the second wireless signal, wherein, in a single-input single-output (SISO) mode of operation of the wireless receiver, the multiplexer is configurable to provide the first amplified signal as the output, the baseband processor processing the first set of digital values, the second set of digital values, the third set of digital values and the fourth set of digital values to extract information contained in the first wireless signal.

2. The receiver of claim 1, further comprising the first antenna and the second antenna.

3. The receiver of claim 1, wherein each of the first wireless signal and the second wireless signal is generated according to one of WLAN, WiMAX, UMTS and LTE standards.

4. The receiver of claim 1, wherein in the SISO mode of operation the baseband processor adds the first set of digital values and the third set of digital values to generate a final in-phase baseband signal, and adds the second set of digital values and the fourth set of digital values to generate a final quadrature-phase baseband signal, wherein the baseband processor processes the final in-phase baseband signal and the final quadrature-phase baseband signal to extract information contained in the first wireless signal.

5. The receiver of claim 2, wherein direct down-conversion is employed in each of the first in-phase receive processing block, the first quadrature-phase receive processing block, the second in-phase receive processing block, and the second quadrature-phase receive processing block.

6. The receiver of claim 5, wherein each of the first in-phase receive processing block, the first quadrature-phase receive processing block, the second in-phase receive processing block, and the second quadrature-phase receive processing block comprises a corresponding mixer, low-pass filter (LPF) and analog-to-digital converter (ADC).

* * * * *